3,654,089
PRODUCTION OF AMYLO-1,6-GLUCOSIDASE
Lowell E. Coker and Almerin W. Turner, Decatur, Ill., assignors to A. E. Staley Manufacturing Company, Decatur, Ill.
No Drawing. Filed Oct. 22, 1969, Ser. No. 868,630
Int. Cl. C12d 13/10
U.S. Cl. 195—65       7 Claims

ABSTRACT OF THE DISCLOSURE

Utilization of phytate filtrate and/or steep liquor as the principal nitrogenous material for the production of amylo-1,6-glucosidase, comprising (1) bringing together in an aqueous medium induced cells capable of producing amylo-1,6-glucosidase and at least one nitrogenous material selected from the group consisting of steep liquor and phytate filtrate and (2) incubating at pH 6.0 to 8.1 to produce amylo-1,6-glucosidase.

DISCLOSURE OF THE INVENTION

This invention relates to the production of amylo-1,6-glucosidase. More particularly, this invention relates to the use of steep liquor and phytate filtrate as the principal nitrogenous materials in the production of amylo-1,6-glucosidase.

It is well known that millions of pounds of starch are converted each year into syrups and crystalline products by treatment with acids and/or enzymes. Due to the large quantities of enzymes or hydrolases employed in these processes, enzymes producers have developed various techniques for optimizing the yield of enzyme from cultures. Generally speaking, the starch hydrolases are produced by a two-stage process. In the first stage, usually called the "propagation stage," a small inoculum of culture is added to a suitable carbohydrate-nitrogenous source designed to encourage the propagation and growth of a large population of cells capable of producing the desired hydrolase without actually forming hydrolase. After the inoculum is built up, cells resulting from the propagation of the inoculum are added to a larger vessel or production fermenter containing a second carbohydrate-nitrogenous source designed to produce an optimum concentration of the desired hydrolase. This stage is usually called the "production stage."

In the last ten years scientists have succeeded in isolating amylo-1,6-glucosidase from certain bacterial cultures. This enzyme, which is often called pullulanase, is capable of debranching starch. Prior to this invention, amylo-1,6-glucosidase has been prepared by growing a culture of the type isolated from a strain of *Aerobacter aerogenes* on a substrate comprising beef extract and/or peptone as the nitrogenous source. Extensive laboratory work by us has shown that amylo-1,6-glucosidase can only be produced in a substrate maintained at pH 6.0 to 8.1. If the pH drops below 6 or goes above 8.1, enzyme production stops and cannot be restarted by merely adjusting the substrate pH. Accordingly, any nitrogenous material employed to produce amylo-1,6-glucosidase must be in an assimilable form at pH 6.0 to 8.1. Although beef extract and/or peptone are soluble at pH 6.0 to 8.1 and have the added advantage that the assimilation of these proteins does not have any serious effect on the pH of the substrate, the relatively high cost and large amounts of these proteins employed during the production stage has hindered the commercialization of amylo-1,6-glucosidase.

The object of this invention is to provide a relatively inexpensive principal source of nitrogenous material for the production of amylo-1,6-glucosidase.

For the purpose of this invention, "protein equivalent" is equal to percent nitrogen multiplied by 6.25.

We have now found that it is possible to employ steep liquor and/or calcium phytate liquor as the principal nitrogenous materials in the production of amylo-1,6-glucosidase. Surprisingly, steep liquor, which forms a voluminous greenish precipitate on raising the pH to about 6, and phytate filtrate, which tends to precipitate at around pH 5.8 to 6.0, can be utilized as nitrogenous materials for the production of amylo-1,6-glucosidase. Though in a precipitated state, the nitrogenous material is still in an assimilable form within the pH range of 6.0 to 8.1 necessary for amylo-1,6-glucosidase production. The utilization of these nitrogenous materials is enhanced markedly by mixing a chelating agent with either steep liquor or phytate liquor filtrate before raising the pH of the nitrogenous material to 6.0 to 8.1. In this way precipitation is suppressed and, in some cases, completely eliminated resulting in better utilization and assimilation of the nitrogenous material. Further, other things being equal, these two nitrogenous materials tend to give higher yields of amylo-1,6-glucosidase than beef extract and/or peptone.

Briefly, amylo-1,6-glucosidase is produced by bringing together induced cells capable of producing amylo-1,6-glucosidase with either steep liquor or phytate filtrate. The induced cells can be added to a suitable substrate containing either steep liquor or phytate filtrate and adjusted to about pH 6.0 to 8.1 or the amylo-1,6-glucosidase cells can be added to a suitable substrate containing either steep liquor or phytate filtrate at pH 6.0 to 8.1.

The steep liquor (corn steep liquor) and/or phytate filtrate (steep liquor from which the phytate has been removed) employed in our invention is preferably mixed with a water-soluble chelating agent and then adjusted to about pH 6.0 to 8.1 with an alkaline material, such as ammonium hydroxide or alkali metal hydroxide. In this way precipitation is suppressed and, in some cases, completely eliminated resulting in better utilization and assimilation of the nitrogenous material. The chelating agents also increase the yield of amylo-1,6-glucosidase in the production stage apparently by acting as release agents. The chelating agents seem to promote the release of enzyme from the cellular slimes thereby providing additional sites for amylo1,6-glucosidase production.

Suitable chelating agents for use in this invention include water-soluble salts of monoaminopolycarboxylic acids, such as alkali (sodium) metal salts of nitrilotriacetic acid, alkylenepolyaminopolycarboxylic acids, such as the sodium salt of ethylene diaminetetraacetic acid, the sodium salt ethylenediaminetetrapropionic acid, the sodium salt of ethylene diamine-di(orthohydroxyphenyl)-diacetic acid, the sodium salt of ethylenediaminedi-(hydroxyethyl)-diacetic acid, the potassium salt of diaminocyclohexane tetraacetic acid, alkali metal salts of hydroxycarboxylic acids, such as sodium citrate, etc. These chelating agents can be employed in a concentration of about 0.0001 mole to 0.1 mole per 1% by weight protein solids. The sodium salt of ethylenediaminetetraacetic acid is particularly preferred because it is readily available and almost completely eliminates the precipitation of steep liquor and phytate filtrate at pH 6 to 8.1.

The amylo-1,6-glucosidase cultures used in this invention include any amylo-1,6-glucosidase preparation, such as those reported by Bender & Wallenfels in Biochemische Zeitschrift, vol. 334, pagess 79–95 (1961). Other information covering the use and production of this enzyme can be found in Methods of Enzymology, vol. 8, pages 555–559 (1966). According to the above references, amylo-1,6-glucosidase can be readily obtained from the organism *Aerobacter aerogenes*. Certain strains of the organism, *Aerobacter aerogenes*, have been reported to be particularly good sources for obtaining this enzyme. For example,

*Aerobacter aerogenes* (U-58), which is believed to be a direct descendant of the original strain isolated by Bender & Wallenfels, has been found to be a particularly good source of this enzyme. Various ultraviolet induced mutants of *Aerobacter aerogenes* (U-58) can also be used. Other reported strains of *Aerobacter aerogenes* which can be used include *Aerobacter aerogenes* ATCC 9621 and ATCC 15050.

In somewhat greater detail, cells are propagated by adding scrapings of a stock culture capable of producing amylo-1,6-glucosidase (*Aerobacter aerogenes*) to an aqueous nitrogen-carbohydrate substrate. Although the nitrogen source employed in this stage can be steep liquor or phytate filtrate, any nitrogen source can be employed since the propagation stage is carried out on a small scale. Beef extract and peptone are particularly suitable in this stage since the assimilation of these proteins does not have a serious effect on the substrate pH. On the other hand, the assimilation of steep liquor and/or phytate filtrate results in the pH rising necessitating pH control.

The carbohydrate employed in the propagation stage serves principally as a carbon source for cell propagation and can be an inducer, such as maltose, maltotriose and/or pullulan or a non-inducer, such as dextrose. The carbohydrate can be present in a concentration of 0.1 to 10% by weight of the aqueous substrate, preferably 0.4 to 2.5% by weight. If desired, mixtures of carbohydrates can be employed.

The cells are incubated in the propagation stage at a pH of about 5.0 to 8.5, preferably 5.8 to 8.0, at from about 5° C. to 45° C., preferably 20 to 35° C., for about 10 to 72 hours, preferably 12 to 24 hours, during which time the number of cells can increase 50,000 fold. If the pH or temperature varies from the above ranges, cell propagation stops or is severely retarded. If incubation is carried out for less than 10 hours, an insufficient population of cells is provided in the first stage. On the other hand, if cell propagation is carried out for more than 72 hours, there is a tendency for deterioration of the cells and lower yields of amylo-1,6-glucosidase.

If maltose, maltotriose or pullulan constitute the principal carbohydrate source during the propagation stage, part of the carbohydrate source is utilized to produce enzyme with consequent lower yields of cells capable of producing amylo-1,6-glucosidase. In this case, the propagation stage can be viewed as a combined propagation-induction stage. Maximum cell propagation takes place when dextrose is the sole or principal carbohydrate source, since no enzyme forms until after the dextrose is consumed and the cells are conditioned in a medium containing one or more of the inducers, namely maltose, maltotriose and/or pullulan. In this case, induction (incubation in a substrate containing either maltose, maltotriose or pullulan) must be carried out prior to or simultaneously with the production stage.

The induced cells are added to a substrate containing a suitable carbohydrate and either phytate filtrate or steep liquor, prepared as indicated above, to produce amylo-1,6-glucosidase in the production stage. The phytate filtrate and/or steep liquor in the substrate should be present in a concentration sufficient to provide a protein equivalent of about 0.5 to 10% by weight on a wet basis, preferably 0.5 to 5% by weight. The composition is incubated during the production stage at about 5 to 45° C., preferably 20 to 35° C., until the desired concentration of enzyme is produced. The substrate must be maintained at a pH of 6.0 to 8.1, preferably 6.1 to 7.9. Failure to operate within the pH range results in the stoppage of enzyme production and enzyme production is not resumed after adjusting the pH to the designated range. Since the assimilation of phytate filtrate and steep liquor is accompanied by a rise in the pH of the substrate, it is preferred to start the enzyme production at about pH 6.0 to 6.5. The pH is maintained below about 8.1 by adding an aqueous organic or inorganic acid, such as aqueous acetic acid or hydrochloric acid, as needed. Generally during this step, maximum enzyme production is encouraged by suitable oxygenation, preferably by sparging with an oxygen containing gas, such as air.

The amylo-1,6-glucosidase produced in the production phase can be isolated and/or purified by any means employed for isolating amylo-1,6-glucosidase prepared by other processes.

The examples following are merely illustrative and should not be construed as limiting the scope of the invention.

EXAMPLE 1

Cells from a stock culture of *Aerobacter aerogenes* were loop-inoculated into 100 mls. of an aqueous pH 7.0 substrate containing 0.3% by weight Bacto-meat Extract, 0.3% by weight Bacto-Peptone, 0.07% by weight sodium chloride, 0.07% $K_2HPO_4$ and 0.5% by weight dextrose. The cells were incubated on a rotary shaker at room temperature for about 16 hours forming a stationary phase population of approximately $5 \times 10^9$ cells per ml. At this point, the repressed cells were incapable of producing amylo-1,6-glucosidase and none of the enzyme could be detected in the medium.

Two milliliters of the dextrose repressed cells were transferred to each of 5 Delong culture flasks containing 100 mls. of an aqueous pH 7.0 inducing substrate containing 0.3% by weight Bacto-Meat Extract, 0.3% by weight Bacto-Peptone, 0.07% by weight sodium chloride, 0.07% by weight $K_2HPO_4$ and 1% by weight maltose. This substrate, which was identical to the substrate employed in the first stage except that the dextrose was replaced with twice the concentration of maltose, contained $5 \times 10^7$ cells per ml. The entire population of dextrose repressed cells was induced simultaneously and incubated at room temperature on a rotary shaker for about six hours during which time approximately 4 to 5 cell divisions occurred yielding an induced population of about $1 \times 10^9$ cells per ml. At this point the fully induced cells were producing amylo-1,6-glucosidase.

Four hundred milliliters of the induced cells were transferred to a 12,000 ml. pH 6.4 aqueous production fermenter medium containing 360 grams pasted waxy maize starch, 1,450 mls. of corn steep liquor containing 106 grams of dissolved sodium citrate, 60 grams of dissolved ammonium acetate, 139 mls. 50% aqueous KOH and 150 grams of dissolved potassium chloride. The production batch was aerated in the fermenter for about 47 hours at room temperature and the pH was maintained below 7.9 by adding 80% aqueous acetic acid incrementally after the pH reached 7.9. The amylo-1,6-glucosidase was isolated by precipitation with acetone.

Essentially the same results were obtained using *Aerobacter aerogenes* ATCC 9621 and ATCC 15050.

EXAMPLE 2

Essentially the same results are obtained by repeating Example 1 using a molar equivalent of the sodium salt of ethylenediaminetetraacetic acid in place of sodium citrate except that the substrate was virtually precipitate free.

Since many embodiments of this invention may be made and since many changes may be made in the embodiments described, the foregoing is to be interpreted as illustrative only and the invention is defined by the claims appended hereafter.

What is claimed is:

1. The method of utilizing phytate filtrate and/or steep liquor as the principal nitrogenous material for the production of amylo-1,6-glucosidase, which comprises (1) bringing together induced cells capable of producing amylo-1,6-glucosidase in an aqueous substrate medium containing as a principal nitrogenous material at least one nitrogenous material selected from the group consisting of steep liquor and phytate filtrate, and (2) incubating the substrate medium at pH 6.0 to 8.1 to further produce amylo-1,6-glucosidase.

2. The process of claim 1, wherein the aqueous substrate medium contains a water soluble chelating agent.

3. The process of claim 2, wherein the aqueous substrate medium is prepared by bringing together the water soluble chelating agent and the nitrogenous material before adjusting the pH of the aqueous substrate medium to 6.0 to 8.1.

4. The process of claim 2, wherein the water soluble chelating agent is a salt of an alkylenepolyaminepolycarboxylic acid.

5. The process of claim 4, wherein the alkylenepolyaminepolycarboxylic acid comprises ethylenediaminetetraacetic acid.

6. The process of claim 2, wherein the water soluble chelating agent is a salt of a hydroxycarboxylic acid.

7. The process of claim 6, wherein the hydroxycarboxylic acid is citric acid.

References Cited

UNITED STATES PATENTS

| | | | |
|---|---|---|---|
| 3,490,995 | 1/1970 | Wallenfels | 195—66 |
| 3,330,738 | 7/1967 | Napier | 195—66 |
| 3,560,345 | 2/1971 | Yokobayashi et al. | 195—66 |

LIONEL M. SHAPIRO, Primary Examiner

U.S. Cl. X.R.

195—102, 114